(12) United States Patent
Cheng et al.

(10) Patent No.: US 11,818,132 B2
(45) Date of Patent: Nov. 14, 2023

(54) AUTHORIZED ACCESS LIST GENERATION METHOD AND INFORMATION SECURITY SYSTEM USING SAME

(71) Applicant: QNAP SYSTEMS, INC., New Taipei (TW)

(72) Inventors: Mao-Hung Cheng, New Taipei (TW); Yu-Jui Cheng, New Taipei (TW); Shih-Chan Huang, New Taipei (TW); Tong-Bo Su, New Taipei (TW); Shih-Ming Hu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 124 days.

(21) Appl. No.: 17/140,929

(22) Filed: Jan. 4, 2021

(65) Prior Publication Data

US 2022/0124095 A1  Apr. 21, 2022

(30) Foreign Application Priority Data

Oct. 15, 2020  (TW) .................................. 109135765

(51) Int. Cl.
*G06F 7/04* (2006.01)
*H04L 9/40* (2022.01)

(52) U.S. Cl.
CPC .......... *H04L 63/101* (2013.01); *H04L 63/083* (2013.01); *H04L 63/0876* (2013.01)

(58) Field of Classification Search
CPC ... H04L 9/0866; H04L 63/101; H04L 63/083; H04L 63/0876; G06F 21/44; G06F 21/552; H04W 12/06
See application file for complete search history.

(56) References Cited

U.S. PATENT DOCUMENTS 7,305,090 B1 * 12/2007 Hayes ................... H04L 9/3226
380/247
7,761,542 B2 * 7/2010 Nakamura .............. H04L 67/00
705/16

(Continued)

OTHER PUBLICATIONS

Hauser et al, Establishing a Session Database for SDN Using 802.1X and Multiple Authentication Resources, IEEE, May 25, 2017, pp. 1-7. (Year: 2017).*

(Continued)

*Primary Examiner* — Philip J Chea
*Assistant Examiner* — Jenise E Jackson
(74) *Attorney, Agent, or Firm* — GUICE PATENTS PLLC

(57) ABSTRACT

An authorized access list generation method including: at least one network service providing device registering for an authorized access list notification service with a server, the authorized access list including at least one authorization related record of at least one legitimate user device; the legitimate user device outputting a user ID to the server to log into the server, and directly sending an access request to a target network service provider after logging into the server, and continuing to provide an IP address being used and a device ID to the server to update a corresponding authorization related record; and the target network service providing device comparing the IP address, stored in each authorization related record of the authorized access list, with the IP address of a user device issuing an access request, and rejecting the access request if no matched result is found.

6 Claims, 7 Drawing Sheets

(56) References Cited

U.S. PATENT DOCUMENTS

| | | | | |
|---|---|---|---|---|
| 2012/0148043 A1* | 6/2012 | Tofighbakhsh | ..... | H04W 12/082 380/247 |
| 2012/0254476 A1* | 10/2012 | De Souza | ............... | H04L 67/59 710/10 |
| 2013/0117400 A1* | 5/2013 | An | ......................... | H04L 51/04 709/206 |
| 2016/0337787 A1* | 11/2016 | Palin | ........................ | H04W 4/50 |
| 2017/0180382 A1* | 6/2017 | Taylor | ................. | H04L 12/2803 |
| 2018/0047232 A1* | 2/2018 | Sakumoto | .......... | G07C 9/00309 |
| 2018/0191677 A1* | 7/2018 | Roychoudhury | ... | H04L 41/0836 |
| 2019/0296969 A1* | 9/2019 | Zimny | .................. | H04W 12/06 |
| 2020/0195609 A1* | 6/2020 | Leung | ................ | H04L 63/0236 |
| 2020/0304853 A1* | 9/2020 | Chen | .................. | H04L 63/0236 |
| 2021/0150015 A1* | 5/2021 | Amarendra | ............ | G06F 21/602 |
| 2021/0264299 A1* | 8/2021 | Tomoda | ............. | G06Q 20/4016 |

OTHER PUBLICATIONS

Papatheodoulou et al, Architecture and System Design of Authentication, Authorization, and Accounting Service, IEEE, May 23, 2009, pp. 1831-1837. (Year: 2009).*

* cited by examiner

# AUTHORIZED ACCESS LIST GENERATION METHOD AND INFORMATION SECURITY SYSTEM USING SAME

BACKGROUND OF THE INVENTION

Field of the Invention

The present invention relates to an authorized access list generation method, in particular to a method for generating an authorized access list that can ensure the information security of a network service providing device.

Description of the Related Art

In today's society, using the Internet to transmit (upload or download) files, photos or videos has become a part of people's daily life. On the other hand, incidents of hackers hacking into specific websites to steal files are also happening from time to time.

To ensure the information security of the network service system, a general approach is to adopt account and password for protection. However, if every legitimate user has to enter an account and a password every time they access a network service, it will be troublesome for them.

In addition, when a general network service providing device is open to external requests, it has to allow external connections and check the requester's authorization. However, when the network service providing device is open to external connections, hackers may take advantage of a loophole thereof to bypass the authorization check to get control of the network service providing device, or directly disable the network service providing device.

To solve the aforementioned problems, there is an urgent need in this field for an efficient method for ensuring network security.

SUMMARY OF THE INVENTION

One objective of the present invention is to disclose an authorized access list generation method, which can effectively protect each registered network service providing device from cyberattacks by installing an authorization and authentication device in a network service system to automatically update authorization related record for each aforementioned registered network service providing device.

Another objective of the present invention is to disclose an authorized access list generation method, which can automatically update the IP address of a legitimate user device for a network service providing device, so as to effectively prevent a malicious user device from using an IP address previously used by the legitimate user device to access the network service providing device, and in the meantime enable the legitimate user device to access the network service providing device even after it switches to a different IP address.

Still another objective of the present invention is to disclose an authorized access list generation method, which can use a cloud server to be responsible for a registration process of legitimate user devices and continuously tracking IP addresses used by the legitimate user devices to adaptively update a content of an authorized access list, so that a network service providing device can allow access requests from legitimate user devices and deny access requests from malicious user devices based on the latest content of the authorized access list.

To achieve the foregoing objectives, an authorized access list generation method is proposed, which is used to control network service requests of at least one user device in a network service system, the network service system having an authentication and authorization server and at least one network service providing device, the method including:

the at least one network service providing device registering for an authorized access list notification service with the authentication and authorization server to obtain a current content of an authorized access list provided by the authentication and authorization server, the authorized access list including at least one authorization related record of at least one aforementioned user device to be allowed access, and each aforementioned authorization related record including a user ID, an authorized device ID, a network service providing device ID, and an IP address;

a legitimate user device of the at least one user device logging into the authentication and authorization server by outputting one aforementioned user ID to the authentication and authorization server, and directly sending an access request to a target device of the at least one network service providing device after logging into the authentication and authorization server, and continuing to provide the IP address in use and a device ID to the authentication and authorization server to update the IP address and the authorized device ID in a corresponding aforementioned authorization related record; and the target device comparing the IP address, stored in each aforementioned authorization related record of an aforementioned authorized access list provided by the authentication and authorization server, with the IP address of an aforementioned user device sending an access request to the target device, and rejecting the access request if each aforementioned comparison operation produces a not-matched result.

In one embodiment, when one aforementioned comparison operation produces a matched result, the target device further determines whether the authorized device ID in a corresponding aforementioned authorization related record matches the device ID of the user device issuing the access request, if true, the access request is allowed, and if false, the access request is rejected.

In one embodiment, the method further includes:

when the access request is rejected, the device ID of the user device issuing the access request is recorded into a blacklist.

In possible embodiments, the user ID includes an account and a password, and the password can be a text password or a biometric password.

In possible embodiments, the user device can be a smart phone, a portable computer, a personal computer, a networked camera, or a wearable device.

In one embodiment, the network service providing device is a network attached storage device.

To achieve the above objectives, the present invention further provides an information security system, which is installed in a network and has an authentication and authorization server and at least one network service providing device to execute an authorized access list generation method to control at least one network service request of at least one user device, the method including:

the at least one network service providing device registering for an authorized access list notification service with the authentication and authorization server to obtain a current content of an authorized access list provided by the authentication and authorization server, the authorized access list including at least one authorization related record of at least one aforementioned user device to be allowed access, and each aforementioned authorization related record including a user ID, an authorized device ID, a network service providing device ID, and an IP address;

a legitimate user device of the at least one user device logging into the authentication and authorization server by outputting one aforementioned user ID to the authentication and authorization server, and directly sending an access request to a target device of the at least one network service providing device after logging into the authentication and authorization server, and continuing to provide the IP address in use and a device ID to the authentication and authorization server to update the IP address and the authorized device ID in a corresponding aforementioned authorization related record; and the target device comparing the IP address, stored in each aforementioned authorization related record of an aforementioned authorized access list provided by the authentication and authorization server, with the IP address of an aforementioned user device sending an access request to the target device, and rejecting the access request if each aforementioned comparison operation produces a not-matched result.

In one embodiment, when one aforementioned comparison operation produces a matched result, the authorized access list generation method makes the target device to further determine whether the authorized device ID in a corresponding aforementioned authorization related record matches the device ID of the user device issuing the access request, if true, the access request is allowed, and if false, the access request is rejected.

In one embodiment, the authorized access list generation method further includes:

when the access request is rejected, the device ID of the user device issuing the access request is recorded into a blacklist.

In possible embodiments, the user ID includes an account and a password, and the password can be a text password or a biometric password.

In possible embodiments, the user device can be a smart phone, a portable computer, a personal computer, a networked camera, or a wearable device.

In one embodiment, the network service providing device is a network attached storage device.

In possible embodiments, the network can be an Internet or a local area network.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The principle of the present invention lies in:

(1) Install an authentication and authorization server in a network service system to accept the registration of each legitimate user device and continuously update the device ID and IP address in the authorization related record for each legal user device;

(2) Make at least one network service providing device in the network service system check the IP address of a user device requesting a network service by referencing the latest authorization related records provided by the authentication and authorization server, and deny the request when no matched IP address is found in the latest authorization related records. As the authentication and authorization server is responsible for updating the authorization related record of each legitimate user device and sending the updated authorization related record to each network service providing device in the network service system, therefore, each network service providing device in the network service system can determine whether to accept a network service request of a user device by referencing received authorization related records, so that any legitimate user device can continue to access a network service providing device even after switching to a different IP address, while the access request for the network service providing device from any malicious user device using an IP address previously used by a legitimate user device will be denied.

Figure 1:
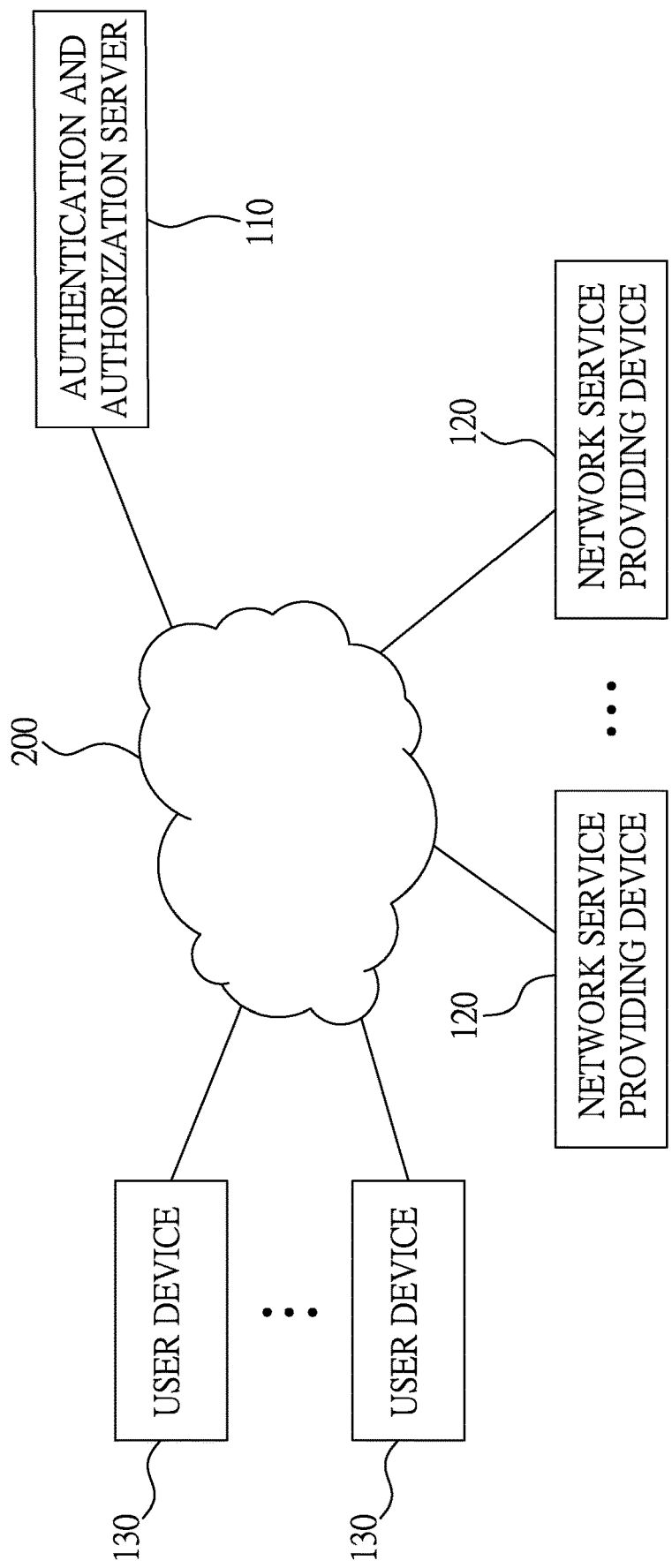
FIG. 1 illustrates a block diagram of an embodiment of the information security system of the present invention.

Based on the above-mentioned principle, the present invention proposes an information security system. Please refer to FIG. 1, which illustrates a block diagram of an embodiment of the information security system of the present invention. As shown in FIG. 1, the information security system includes an authentication and authorization server 110 and at least one network service providing device 120 for executing an authorized access list generation method on a network 200 to control at least one network service request of at least one user device 130, where the network 200 can be an Internet or a local area network.

The authentication and authorization server 110 is used to accept the registration of any user device 130 to log it as a legitimate user device according to its user ID (which may include an account and a text password or biometric password) and assign it an authorization related record, each aforementioned authorization related record includes a user ID, an authorized device ID, a network service providing device ID and an IP address, and the authentication and authorization server 110 will continue receive the device ID and the IP address from each legitimate user device to update the authorized device ID and the IP address in the authorization associated record of each legitimate user device, thereby updating the content of an authorized access list corresponding to each network service providing device 120, where the authorized access list includes at least one authorization related record, and the authorized access list can be stored in the authentication and authorization server 110 or a separately arranged memory device. In addition, the authentication and authorization server 110 sends an aforementioned authorized access list to a corresponding network service providing device 120.

After registering for an authorized access list notification service with the authentication and authorization server 110, each network service providing device 120 can obtain the current content of an authorized access list provided by the authentication and authorization server 110, so that any legitimate user device 130 can successfully obtain a network service, and any access request from any user device 130 not found in the authorized access list will be rejected. To be specific, each network service providing device 120 will perform a comparison operation on the IP address, stored in each aforementioned authorization related record of an aforementioned authorized access list provided by the authentication and authorization server 110, and the IP address of a user device 130 sending an access request thereto, and reject the access request if each aforementioned comparison operation produces a not-matched result, and when one aforementioned comparison operation produces a matched result, further determine whether the authorized device ID in a corresponding aforementioned authorization related record matches the device ID of the user device issuing the access request, if true, the access request is allowed, and if false, the access request is rejected.

In addition, in one embodiment, the network service providing device 120 is a network attached storage device.

In addition, in possible embodiments, the user device 130 can be a smart phone, a portable computer, a personal computer, a networked camera or a wearable device.

In addition, the IP address can be a public IP address (corresponding to the Internet) or a private IP address (corresponding to a local area network).

Figure 2A:
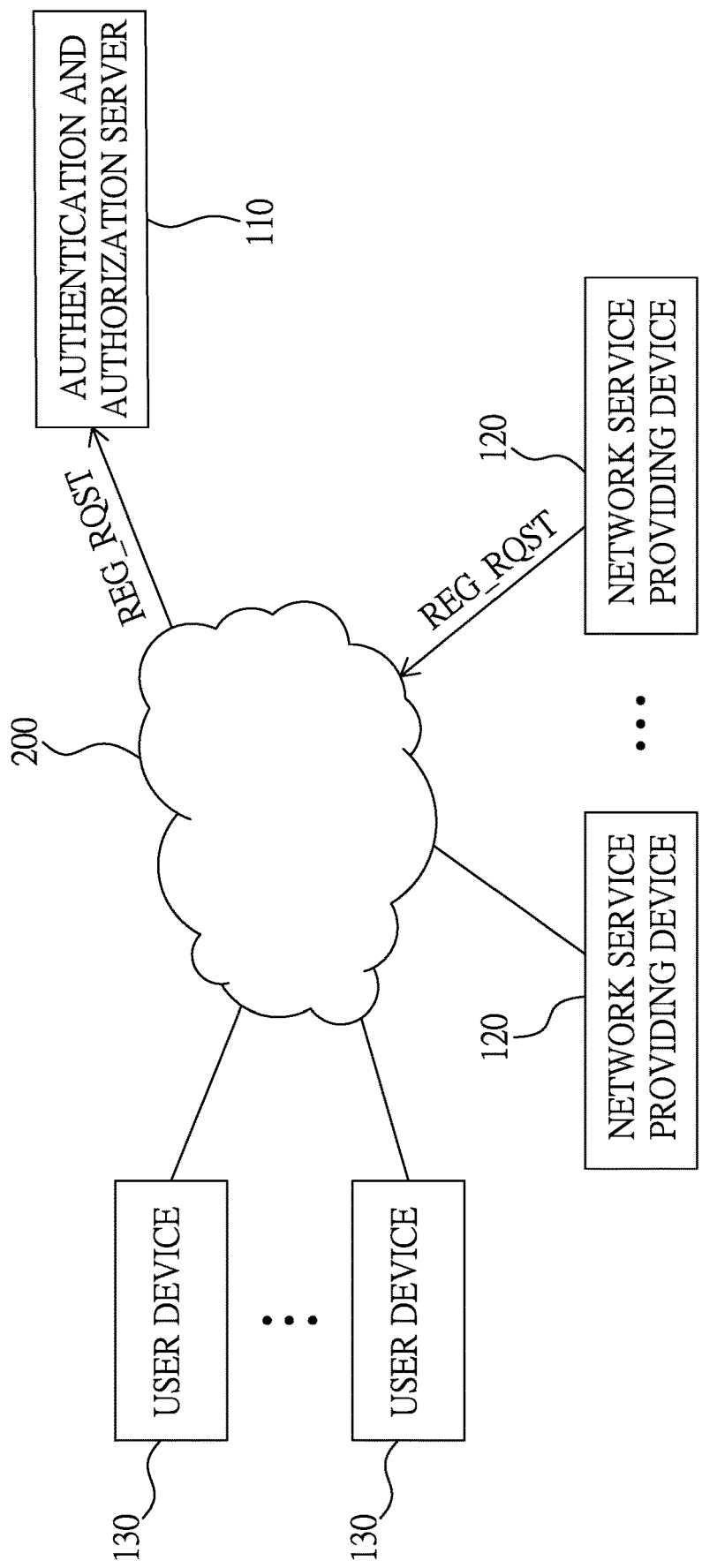
FIG. 2a is a schematic diagram of a network service providing device in the information security system of FIG. 1 sending a registration request to an authentication and authorization server to register for an authorized access list notification service.
Figure 2B:
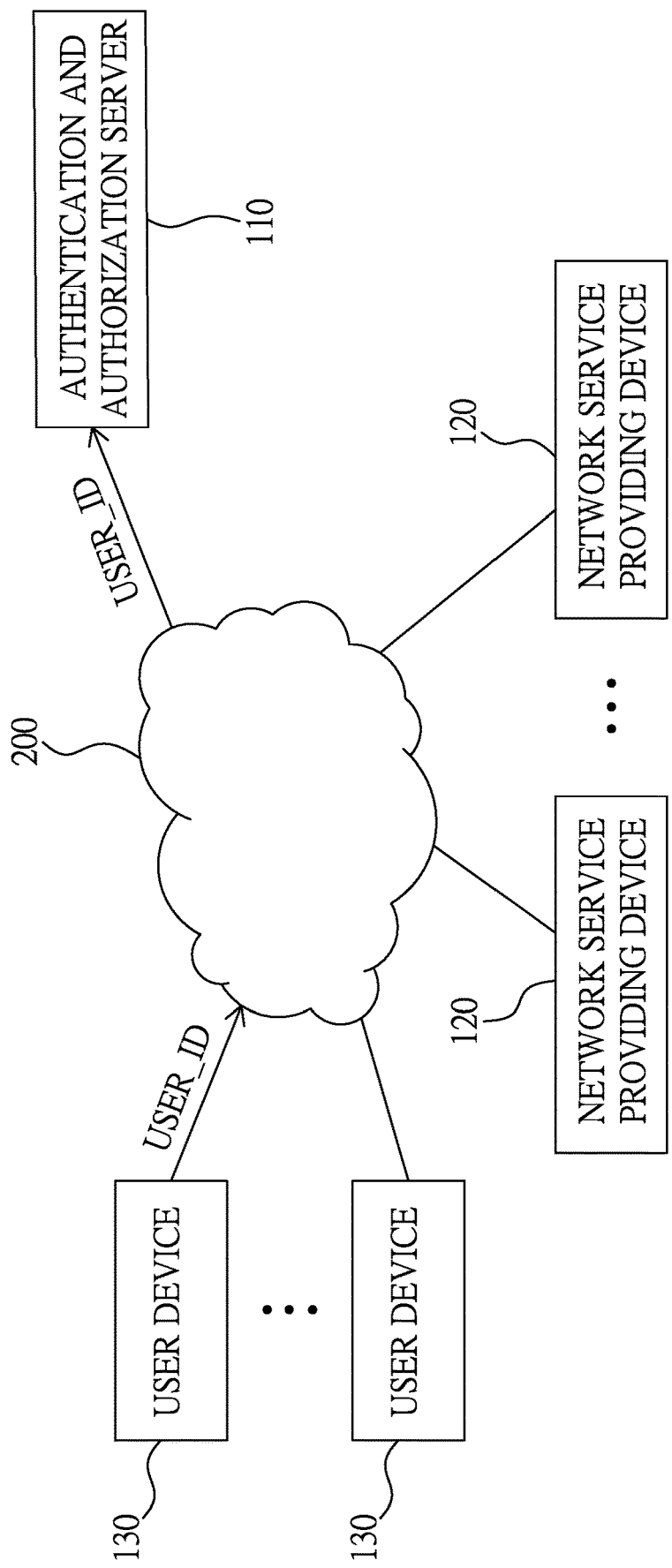
FIG. 2b is a schematic diagram of a legitimate user device in the information security system of FIG. 1 outputting a piece of identity information to the authentication and authorization server to log into the authentication and authorization server.
Figure 2C:
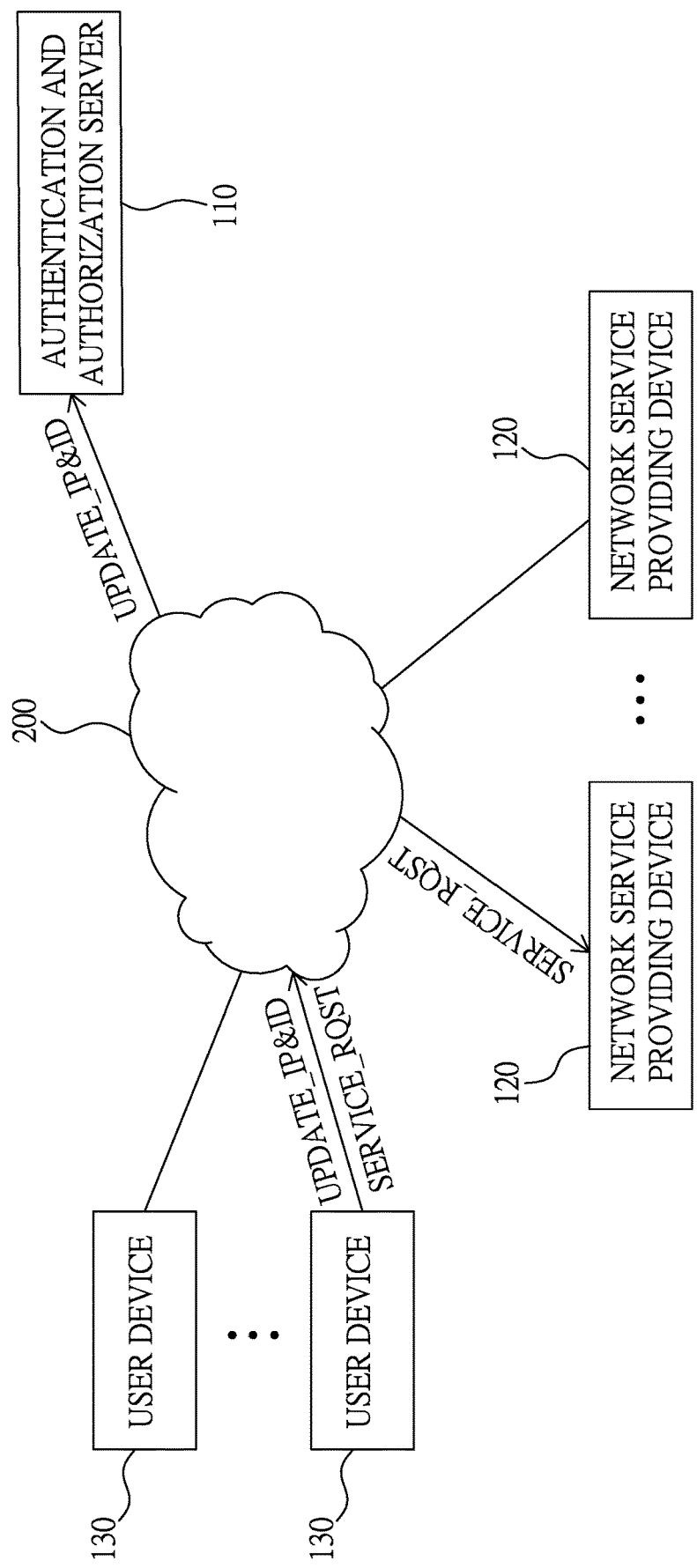
FIG. 2c illustrates a scenario that a legitimate user device in the information security system of FIG. 1 directly sends a service request to a network service providing device after logging into the authentication and authorization server, and continues to provide update information, including an IP address in use and a device ID, to the authentication and authorization server to update a corresponding authorization related record.
Figure 2D:
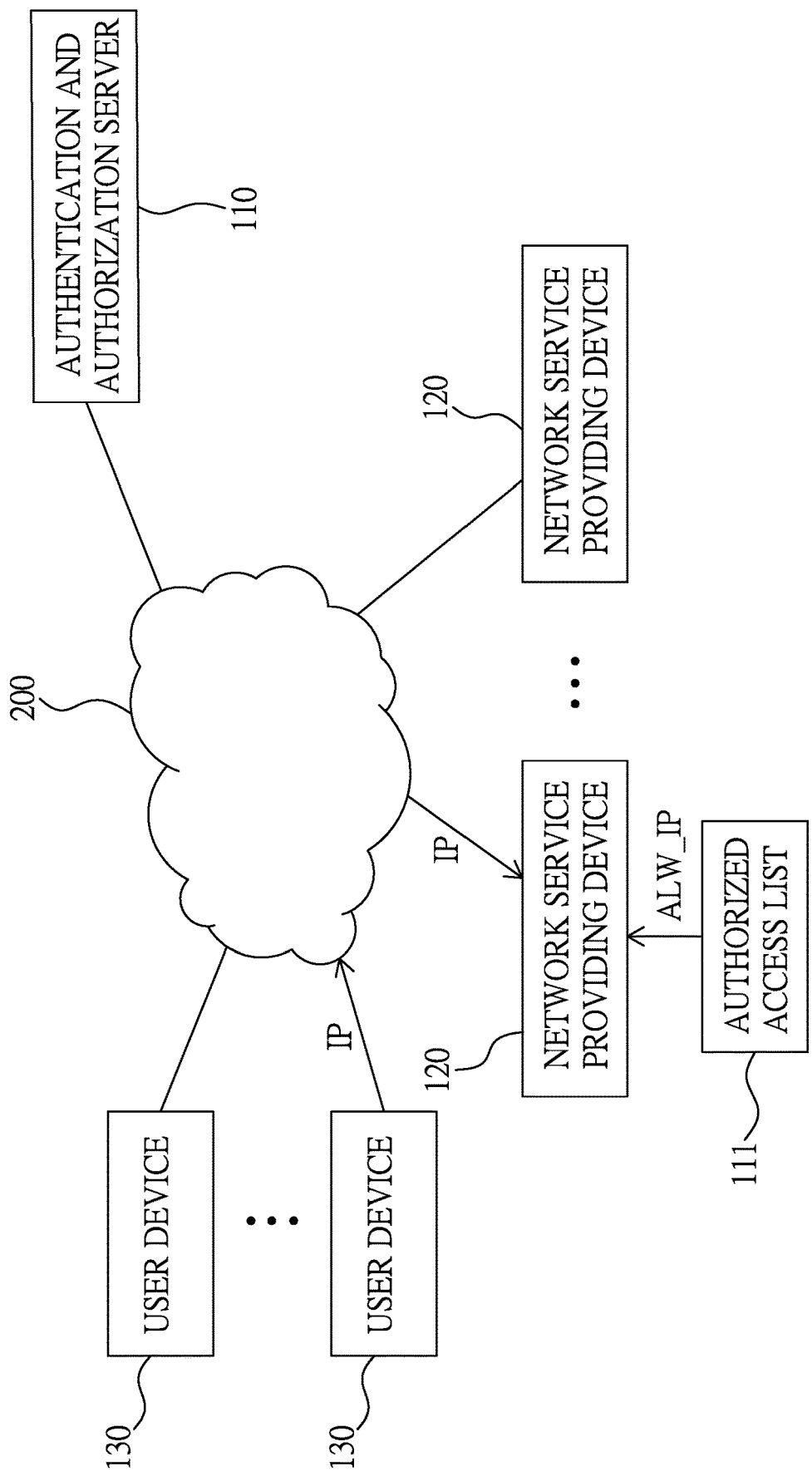
FIG. 2d illustrates a scenario that a network service providing device in the information security system of FIG. 1 performs a comparison operation on the IP address of each authorization related record in an authorized access list and the IP address of a user device issuing an access request to the network service providing device, and denies the access request when no matched result is found.
Figure 2E:
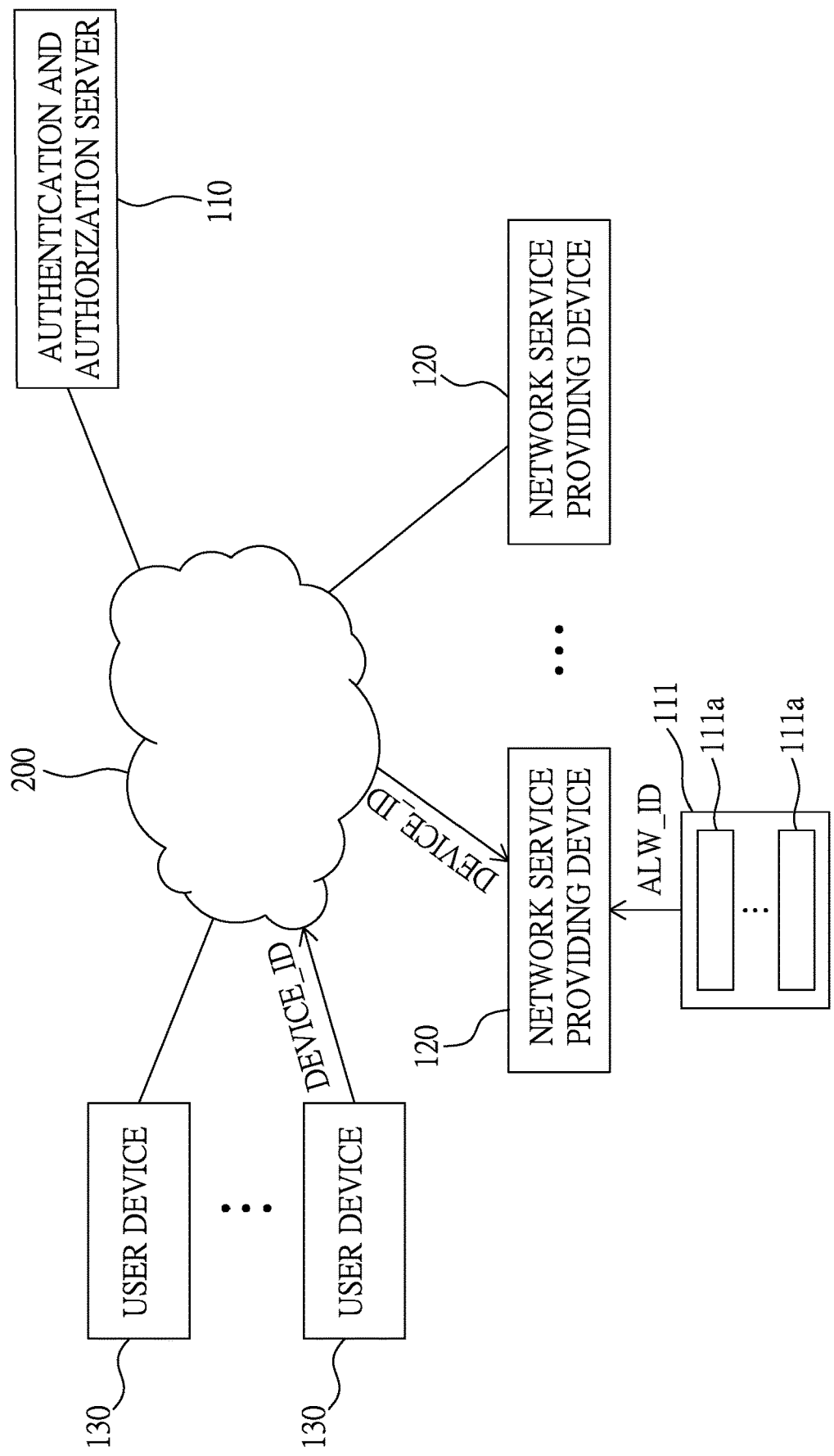
FIG. 2e illustrates a scenario that, when one aforementioned comparison operation produces a matched result, the information security system further determines whether the authorized device ID in a corresponding authorization related record in the authorized access list matches the device ID of the user device issuing the access request.

Please refer to FIGS. 2a-2e, which illustrate five basic operations of the information security system of FIG. 1 during operation, where FIG. 2a is a schematic diagram of a network service providing device 120 in the information security system of FIG. 1 sending a registration request to an authentication and authorization server 110 to register for an authorized access list notification service; FIG. 2b is a schematic diagram of a legitimate user device 130 in the information security system of FIG. 1 outputting a piece of identity information USER-ID to the authentication and authorization server 110 to log into the authentication and authorization server 110; FIG. 2c illustrates a scenario that a legitimate user device 130 in the information security system of FIG. 1 directly sends a service request SERVICE_RQST to a network service providing device 120 after logging into the authentication and authorization server 110, and continues to provide update information UPDATE_IP&ID, including an IP address in use and a device ID, to the authentication and authorization server 110 to update a corresponding authorization related record; FIG. 2d illustrates a scenario that a network service providing device 120 in the information security system of FIG. 1 performs a comparison operation on the IP address ALW_IP of each authorization related record in an authorized access list 111 and the IP address of a user device 130 issuing an access request to the network service providing device 120, and denies the access request when no matched result is found; and FIG. 2e illustrates a scenario that, when one aforementioned comparison operation produces a matched result, the network service providing device 120 in the information security system of FIG. 1 further determines whether the authorized device ID (represented by ALW_ID) in a corresponding authorization related record 111a in the authorized access list 111 matches the device ID (represented by DEVICE_ID) of the user device 130 issuing the access request, if true, the access request is allowed, and if false, the access request is rejected.

Figure 3:
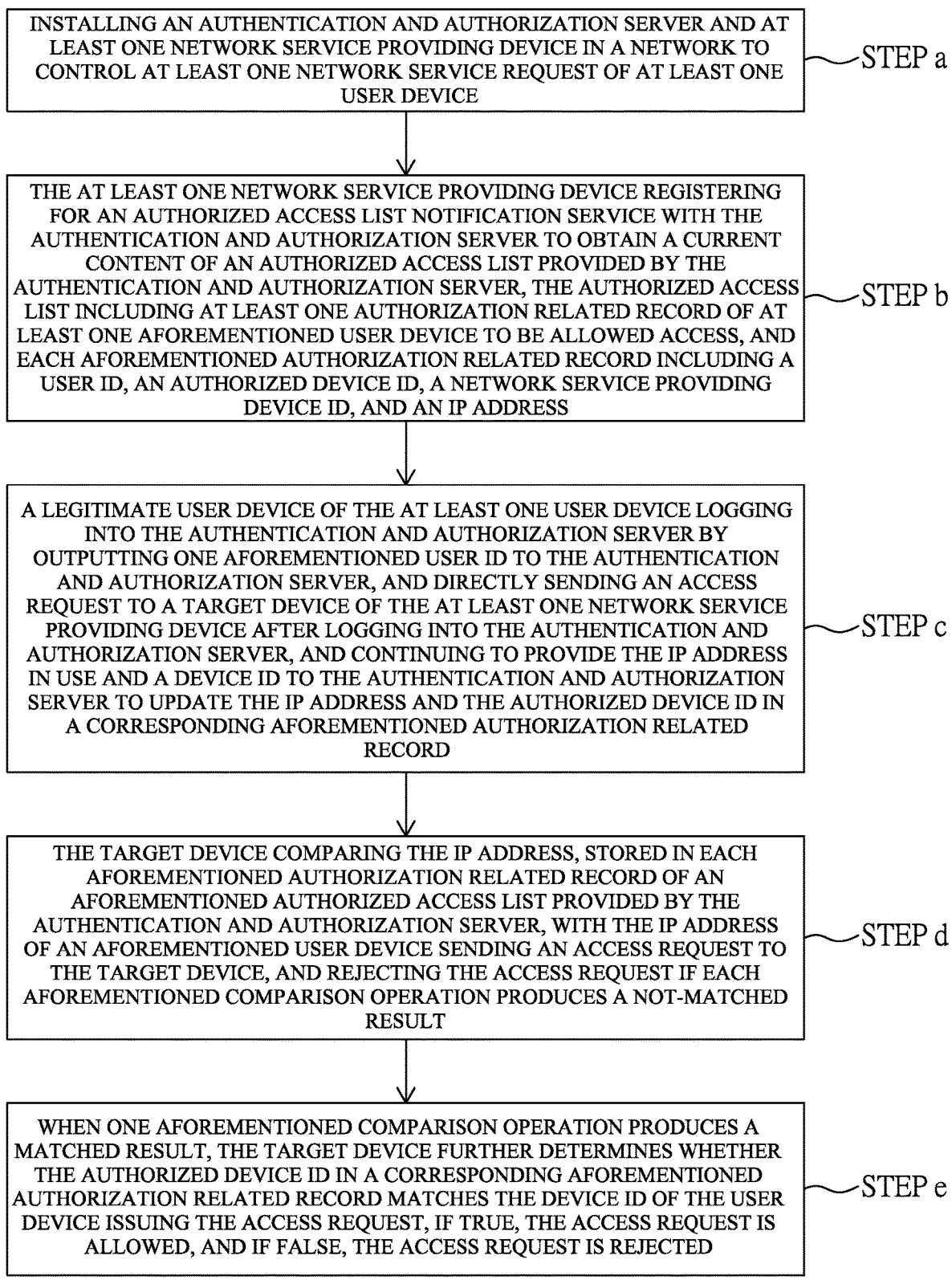
FIG. 3 illustrates a flowchart of an embodiment of the authorized access list generation method of the present invention.

That is, the information security system of FIG. 1 can implement an authorized access list generation method. Please refer to FIG. 3, which illustrates a flowchart of an embodiment of the authorized access list generation method of the present invention. As shown in FIG. 3, the method includes: installing an authentication and authorization server and at least one network service providing device in a network to control at least one network service request of at least one user device (step a); the at least one network service providing device registering for an authorized access list notification service with the authentication and authorization server to obtain a current content of an authorized access list provided by the authentication and authorization server, the authorized access list including at least one authorization related record of at least one aforementioned user device to be allowed access, and each aforementioned authorization related record including a user ID, an authorized device ID, a network service providing device ID, and an IP address (step b); a legitimate user device of the at least one user device logging into the authentication and authorization server by outputting one aforementioned user ID to the authentication and authorization server, and directly sending an access request to a target device of the at least one network service providing device after logging into the authentication and authorization server, and continuing to provide the IP address in use and a device ID to the authentication and authorization server to update the IP address and the authorized device ID in a corresponding aforementioned authorization related record (step c); the target device comparing the IP address, stored in each aforementioned authorization related record of an aforementioned authorized access list provided by the authentication and authorization server, with the IP address of an aforementioned user device sending an access request to the target device, and rejecting the access request if each aforementioned comparison operation produces a not-matched result (step d); and when one aforementioned comparison operation produces a matched result, the target device further determines whether the authorized device ID in a corresponding aforementioned authorization related record matches the device ID of the user device issuing the access request, if true, the access request is allowed, and if false, the access request is rejected (step e). That is, the information security system of FIG. 1 can be used to implement an authorized access list generation method.

According to the method shown in FIG. 3, the present invention can automatically and instantly update the authentication information (device ID and IP address) of each legitimate user device stored in a network service providing device, so that each legitimate user device can successfully obtain a network service provided by the network service providing device without frequently inputting the authentication information, and any illegitimate or malicious user device will be effectively blocked.

In addition, in a possible embodiment, the authorized access list generation method of the present invention further includes: when the access request is rejected, the device ID of a user device 130 issuing the access request will be recorded into a blacklist to enhance the information security of the information security system.

Thanks to the disclosure above, the present invention has the following advantages:

1. The authorized access list generation method of the present invention can effectively protect each registered network service providing device from cyberattacks by installing an authorization and authentication device in a network service system to automatically update authorization related record for each aforementioned registered network service providing device.
2. The authorized access list generation method of the present invention can automatically update the IP address of a legitimate user device for a network service providing device, so as to effectively prevent a malicious user device from using an IP address previously used by the legitimate user device to access the network service providing device, and in the meantime enable the legitimate user device to access the network service providing device even after it switches to a different IP address.
3. The authorized access list generation method of the present invention can use a cloud server to be responsible for a registration process of legitimate user devices and continuously tracking IP addresses used by the legitimate user devices to adaptively update a content of an authorized access list, so that a network service providing device can allow access requests from legitimate user devices and deny access requests from malicious user devices based on the latest content of the authorized access list.
4. The authorized access list generation method of the present invention can record the device ID of a user device issuing an access request into a blacklist to enhance the information security of the information security system when the access request is denied.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. An authorized access list generation method for controlling at least one network service request of at least one user device having an internet protocol (IP) address in a network service system, the network service system having an authentication and authorization server and at least one network service providing device, the method including:

registering, by the at least one network service providing device registering for an authorized access list notification service with the authentication and authorization server to obtain a current content of an authorized access list provided by the authentication and authorization server, the authorized access list including at least one authorization related record of at least one said user device to be allowed access, and each said authorization related record including a user identification (ID), an authorized device ID, a network service providing device ID, and an updatable IP address;

logging into the authentication and authorization server, by a legitimate user device of the at least one user device logging into the authentication and authorization server by outputting one said user ID to the authentication and authorization server, and directly sending an access request to a target device of the at least one network service providing device after logging into the authentication and authorization server, and continuing to provide a currently used IP address and a device ID to the authentication and authorization server to update the updatable IP address and the authorized device ID in a corresponding said authorization related record, the authorization and authentication server automatically updating the authorization related record for the at least one registered network service providing device, enabling the legitimate user device to access the network service providing device even after the legitimate user device switches to a different IP address, and continuously tracking IP addresses used by the legitimate user devices to adaptively update the content of the authorized access list; and comparing, by the target device comparing the updatable IP address, stored in each said authorization related record of one said authorized access list provided by the authentication and authorization server, with the currently used IP address of one said user device sending an access request to the target device, and rejecting the access request if each said comparison operation produces a not-matched result.

2. The authorized access list generation method as disclosed in claim 1, wherein, when one said comparison operation produces a matched result, determining, by the target device further determining whether the authorized device ID in a corresponding said authorization related record matches the device ID of the user device issuing the access request, if true, the access request is allowed, and if false, the access request is rejected.

3. The authorized access list generation method as disclosed in claim 2, further including:

recording the device ID of the user device issuing the access request into a blacklist, when the access request is rejected.

4. The authorized access list generation method as disclosed in claim 1, wherein the user ID includes an account and a password, and the password is a text password or a biometric password.

5. The authorized access list generation method as disclosed in claim 1, wherein the user device is selected from a group consisting of a smart phone, a portable computer, a personal computer, a networked camera, and a wearable device.

6. The authorized access list generation method as disclosed in claim 1, wherein the network service providing device is a network attached storage device.

\* \* \* \* \*